United States Patent
Miyata

(10) Patent No.: US 9,001,148 B2
(45) Date of Patent: Apr. 7, 2015

(54) COMPUTER READABLE RECORDING MEDIUM, INFORMATION PROCESSING APPARATUS, AND INFORMATION PROCESSING METHOD

(75) Inventor: Yuji Miyata, Kitanagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 504 days.

(21) Appl. No.: 13/362,821

(22) Filed: Jan. 31, 2012

(65) Prior Publication Data
US 2012/0242689 A1 Sep. 27, 2012

(30) Foreign Application Priority Data
Mar. 25, 2011 (JP) .................. 2011-068992

(51) Int. Cl.
G09G 5/00 (2006.01)
G06F 3/14 (2006.01)
H04M 1/725 (2006.01)

(52) U.S. Cl.
CPC ............. *G06F 3/14* (2013.01); *H04M 1/7253* (2013.01); *G09G 2360/02* (2013.01); *G09G 2370/022* (2013.01); *G09G 2370/027* (2013.01)

(58) Field of Classification Search
CPC ......... G06T 11/60; G06T 19/00; G06T 11/00; G06F 9/4443; G06F 3/0481
USPC .................................. 345/619, 629
See application file for complete search history.

(56) References Cited

U.S. PATENT DOCUMENTS

| 2004/0207859 A1* | 10/2004 | Kadoi et al. .................. 358/1.1 |
| 2007/0133057 A1 | 6/2007 | Fukunishi |
| 2010/0162106 A1* | 6/2010 | Ikazaki et al. ................. 715/274 |
| 2011/0043844 A1* | 2/2011 | Fukuoka ...................... 358/1.13 |
| 2012/0096360 A1* | 4/2012 | Nishikawa .................... 715/731 |

FOREIGN PATENT DOCUMENTS

JP 2007-152801 A 6/2007

* cited by examiner

*Primary Examiner* — Daniel Hajnik
*Assistant Examiner* — Naveed Hasan
(74) *Attorney, Agent, or Firm* — Merchant & Gould PC

(57) ABSTRACT

An information processing apparatus includes: a transmitting unit transmitting target data of a first format stored in the storing unit, the first format being capable of constituting a multi-page file; a converted-data acquiring unit acquiring, in unit of page, converted data of a second format, which is generated by an external apparatus based on the target data; a display unit displaying an image corresponding to each page based on the converted data; a converted-data storing unit storing the converted data; and a manipulation receiving unit configured to receive an input. If the manipulation receiving unit receives a designation of a page, and the converted data which is generated based on the designated page is not stored in the storing unit, the converted-data acquiring unit acquires the converted data generated based on the designated page of the target data in preference to the other converted data.

21 Claims, 8 Drawing Sheets

COMPUTER READABLE RECORDING MEDIUM, INFORMATION PROCESSING APPARATUS, AND INFORMATION PROCESSING METHOD

CROSS-REFERENCE TO RELATED APPLICATION

This application is based upon and claims the benefit of priority of Japanese Patent Application No. 2011-068992 filed on Mar. 25, 2011, the contents of which are incorporated herein by reference in its entirety.

BACKGROUND

The present disclosure relates to an information processing program, an information processing apparatus, and an information processing method.

There has been known a technology which uploads image data having a format which is difficult to be processed in a terminal, from the terminal to an external apparatus (for example, a sever, a cloud, or the like), and converts the image data into a formant capable of being used in the terminal, in the external apparatus, and downloads the converted image data to the terminal such that the terminal uses the converted image data.

SUMMARY

In a case where image data having a format converted by an external apparatus includes a plurality of pages, if the image data is downloaded sequentially from the first page, there is a problem that it takes a long time until an image designated by a user is displayed.

One of aspects of the present disclosure was made considering the above-mentioned problem, and an object is to provide an information processing program, an information processing apparatus, and an information processing method capable of quickly displaying an image corresponding a designated page even when images are displayed based on converted image data generated in an external apparatus, so as to reduce a waiting time of a user.

The aspect of the present disclosure provides the following arrangements:

An information processing apparatus comprising:

a storing unit configured to store target data of a first format, the first format being capable of constituting a multi-page file;

a transmitting unit configured to transmit the target data stored in the storing unit;

a converted-data acquiring unit configured to acquire, in unit of page, converted data of a second format, which is generated by an external apparatus by converting the target data transmitted by the transmitting unit;

a display unit configured to display an image corresponding to each page included in the target data based on the converted data acquired by the converted-data acquiring unit;

a converted-data storing unit configured to store the converted data acquired by the converted-data acquiring unit; and a manipulation receiving unit configured to receive an input, wherein, if the manipulation receiving unit receives a designation of a page, and the converted data which is generated based on the designated page of the target data is not stored in the converted-data storing unit, the converted-data acquiring unit acquires the converted data generated based on the designated page of the target data in preference to the converted data which is not stored in the converted-data storing unit and does not correspond to the designated page of the target data.

A non-transitory computer readable recording medium storing an information processing program to be executed by a computer of an information processing apparatus including a transmitting unit, a receiving unit, a storing unit, a display unit and a manipulation receiving unit, the information processing program comprising:

a transmission control instruction that causes the transmitting unit to transmit target data of a first format stored in the storing unit, the first format being capable of constituting a multi-page file;

a converted-data acquiring instruction that causes the receiving unit to acquire, in unit of page, converted data of a second format, which is generated by an external apparatus by converting the target data transmitted by the transmitting unit;

a display control instruction that causes the display unit to display an image corresponding to each page included in the target data based on the converted data acquired by the converted-data acquiring instruction; and a converted-data storing instruction that causes the storing unit to store the converted data acquired by the converted-data acquiring instruction, wherein, if the manipulation receiving unit receives a designation of a page, and the converted data which is generated based on the designated page of the target data is not stored in the storing unit, the converted-data acquiring instruction causes the receiving unit to acquire the converted data generated based on the designated page of the target data in preference to the converted data which is not stored in the storing unit and does not correspond to the designated page of the target data.

An information processing method that is performed in an information processing apparatus, the method comprising:

transmitting target data of a first format, the first format being capable of constituting a multi-page file;

acquiring, in unit of page, converted data of a second format, which is generated by an external apparatus by converting the transmitted target data;

displaying an image corresponding to each page included in the target data based on the acquired converted data; and storing the converted data acquired by the converted-data acquiring instruction in a storing unit, wherein, if a designation of a page is received, and the converted data which is generated based on the designated page of the target data is not stored in the storing unit, the converted data generated based on the designated page of the target data is acquired in preference to the converted data which is not stored in the storing unit and does not correspond to the designated page of the target data.

The aspect of the present disclosure can be implemented in various forms such an information processing apparatus, a control device for controlling an information processing apparatus, an information processing system, an information processing method, and a recording medium for recording an information processing program.

DESCRIPTION OF EXEMPLARY EMBODIMENTS

Figure 1:
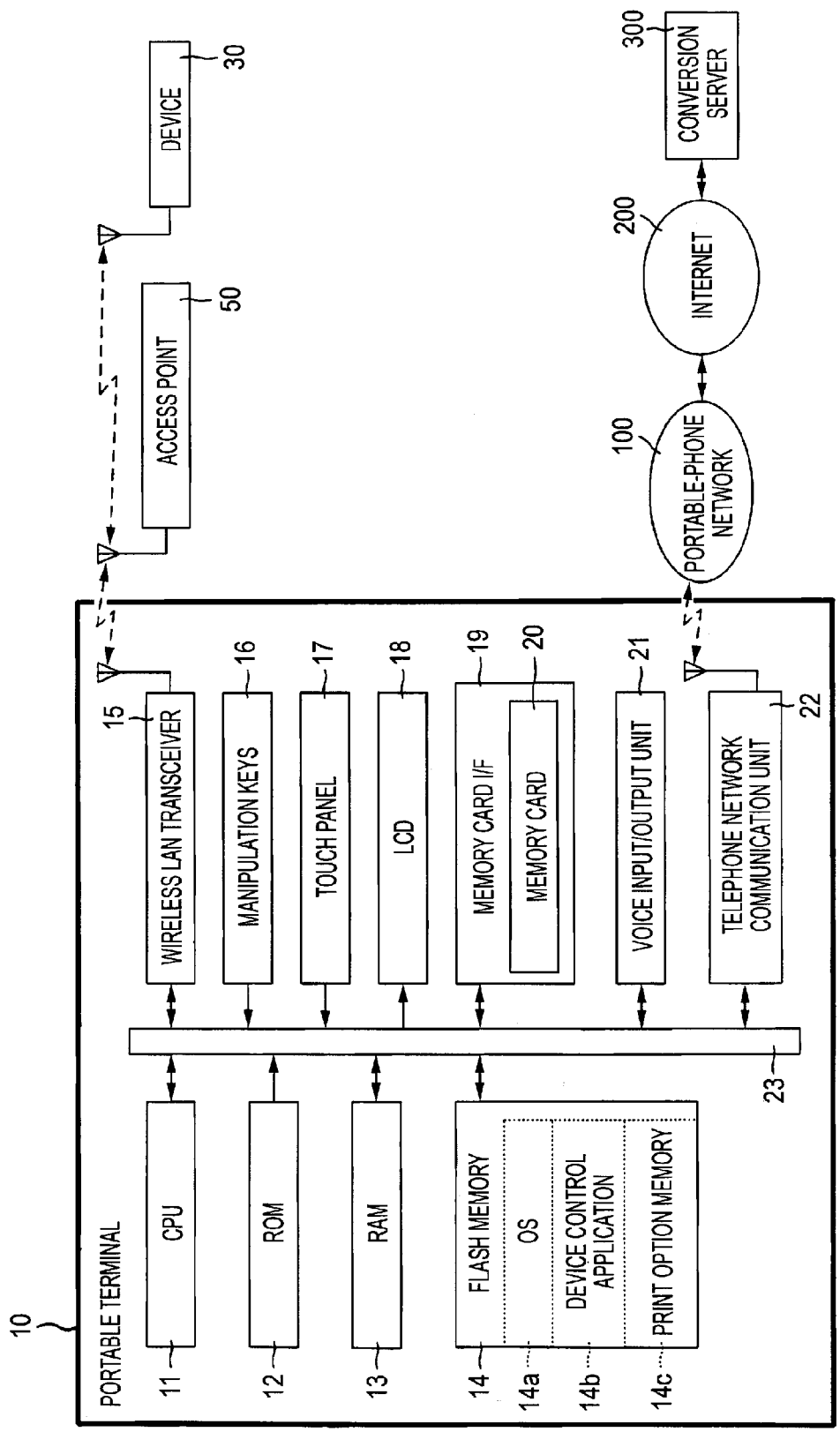
FIG. 1 is a block diagram illustrating an electrical configuration of a portable terminal including a device control application according to a first embodiment.

Hereinafter, exemplary embodiments will be described with reference to the accompanying drawings. FIG. 1 is a block diagram illustrating an electrical configuration of a portable terminal 10 having a device control application 14b according to a first embodiment. The device control application 14b installed in the portable terminal 10 is for allowing a user to directly use a printing function and scanning function of a device 30 from the portable terminal 10, without passing through a personal computer or the like. Particularly, the device control application 14b of the present embodiment is configured to be capable of quickly displaying an image corresponding to a designated page so as to reduce the waiting time of the user even in a case of displaying images based on converted data generated in a conversion server 300.

The portable terminal 10 is a portable phone that enables a voice call with another device through a portable-phone network 100 or can use the Internet 200. Further, the portable terminal 10 performs wireless communication with the device 30 by an infrastructure mode through an access point 50. The portable terminal 10 includes a CPU 11, a ROM 12, a RAM 13, a flash memory 14, a wireless LAN transceiver 15, manipulation keys 16, a touch panel 17, a liquid crystal display 18 (hereinafter, referred to as an LCD 18), a memory card interface 19 (hereinafter, referred to as a memory card I/F 19), a voice input/output unit 21, and a telephone network communication unit 22. These components are connected to one another through bus lines 23.

The CPU 11 controls individual units connected to the bus lines 23, in accordance with fixed values, programs, and the like stored in the ROM 12 or the like. The ROM 12 is a non-volatile memory incapable of rewriting, and the RAM 13 is a volatile memory capable of rewriting.

The flash memory 14 is a rewritable non-volatile memory, and stores an operating system 14a (hereinafter, referred to as an OS 14a), and the device control application 14b. The OS 14a is basic software for implementing standard functions of the portable terminal 10, and is an Android (registered trademark) OS in the present embodiment. The device control application 14b is an application provided by a vendor of the device 30, is installed in the portable terminal 10 by the user, and enables the user to use the device 30 from the portable terminal 10. Hereinafter, the CPU 11 which executes a program such as an application, an operating system, or the like may be referred to simply as the name of the program. For example, a term 'application' may mean 'the CPU 11 that executes an application'.

The flash memory 14 includes a print option memory 14c. The print option memory 14c stores print options for performing printing in the device 30. In the present embodiment, the print options includes information that defines a size of a sheet (sheet size), information that defines a type of a sheet (media type), and information (layout) that defines a value of N (the number of sections) in an N-in-1 image. The N-in-1 image is an image obtained by laying out images corresponding N-number of pages (N is an integer of 1 or greater) in one page.

Information on the print options is not limited to the above-mentioned three kinds, but may be include other options such as an option on a color print or monochrome print. The print options are configured to be appropriately changeable based on a user's predetermined manipulation on a print option screen 76 (see FIG. 2D) displayed on the LCD 18 by the device control application 14b, and whenever the print options are changed, the contents of the print option memory 14c are rewritten.

The wireless LAN transceiver 15 is a circuit for making a Wi-Fi (registered trademark) connection between the portable terminal 10 and other device by a wireless LAN based on IEEE 802.11bg standards. The wireless LAN transceiver 15 enables a wireless communication between the portable terminal 10 and the access point 50.

The manipulation keys 16 are hard keys provided to a housing (not shown) of the portable terminal 10, and receive option information or instructions for the portable terminal 10. The touch panel 17 is provided to overlap the LCD 18, and receives option information and instructions for the portable terminal 10. The LCD 18 displays various screens such as a preview screen 70 (see FIG. 2A, for example). The memory card I/F 19 is an interface for installing a non-volatile memory card 20, and controls data write or read on the memory card 20.

The memory card 20 may be an SD card (registered trademark). The memory card 20 stores, for example, a file downloaded from the Internet 200, a file received as an attachment by an electronic mail, a file generated from scan data and acquired from the device 30, etc. In the present embodiment, it is assumed for description that the memory card 20 includes files having a PDF format (hereinafter, referred to as a PDF file) capable of configuring a multi-page file.

The voice input/output unit 21 is a device for voice input and output that includes a microphone, a speaker, and so on, and the telephone network communication unit 22 is a circuit for performing communication through the portable-phone network 100. The portable-phone network 100 is a communication network based on international mobile telecommunication-2000 (IMT-2000), and is connected to the Internet 200 through a gateway (not shown) so as to enable use of the Internet 200 through the portable terminal 10. The conversion server 300 provides a service for converting a PDF file into image data of a JPEG format (hereinafter, referred to as a JPEG file). In the present embodiment, the device control application 14b is configured to transmit a PDF file, which a user designates as print target data from PDF files stored in the memory card 20, to the conversion server 300, acquire JPEG files generated by conversion of the conversion server 300 on the PDF file (more specifically, JPEG files generated from individual pages included in the PDF file), and perform display of preview screens and generation of print data based on the JPEG files.

Each application (including the device control application 14b) installed in the portable terminal 10 calls an API of the OS 14a, and outputs data for each component of the portable terminal 10, such as the wireless LAN transceiver 15, the manipulation keys 16, the touch panel 17, the LCD 18, the memory card I/F 19, the voice input/output unit 21, and the telephone network communication unit 22, to the OS 14a. In other words, each application controls each component of the portable terminal 10 by calling the API of the OS 14a. Further, each application calls the API of the OS 14a, and acquires data output from each component of the portable terminal 10, and data representing a status of each component, from the OS 14a. That is, each application acquires data representing a status of each component of the portable terminal 10 (including a status of manipulation input to the portable terminal 10) from the OS 14a by calling the API of the OS 14a. The OS 14a may notify the data which each component of the portable terminal 10 outputs, and the data representing the status of each component to each application, to each application, regularly or whenever the status of each component changes. In other words, each application acquires the data representing the status of each component of the portable terminal 10 (including the status of the manipulation input to the portable terminal 10) from the OS 14a by receiving the notification from the OS 14a.

The device 30 is a combined machine having a printer function, a scanning function, a copy function, and the like, includes a wireless LAN transceiver (not shown) having the same configuration as that of the wireless LAN transceiver 15 of the portable terminal 10, and makes a Wi-Fi connection with the portable terminal 10 by a wireless communication through the access point 50. Further, the device 30 is controlled by the device control application 14b of the portable terminal 10, such that the device 30 prints an image based on data received from the portable terminal 10, or reads a document to generate image data and transmits the image data to the portable terminal 10. The access point 50 relays a communication between Wi-Fi terminals.

Figure 2A:
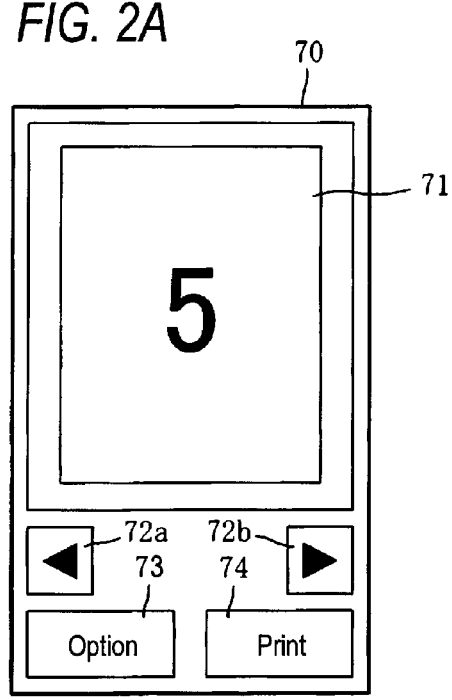
FIGS. 2A to 2D are views for explaining screens that are displayed on an LCD of the portable terminal.
Figure 2B:
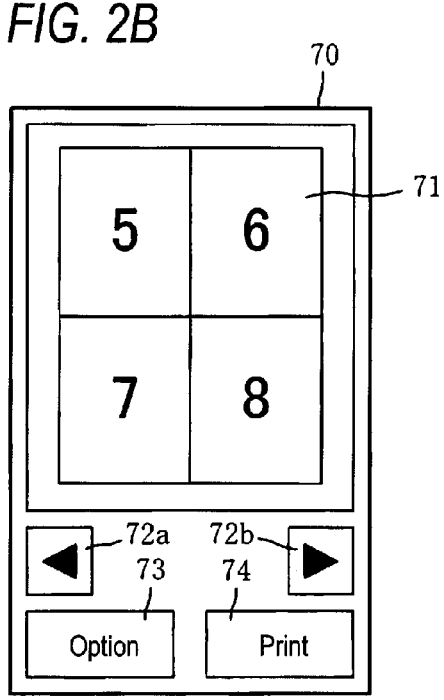
Figure 2C:
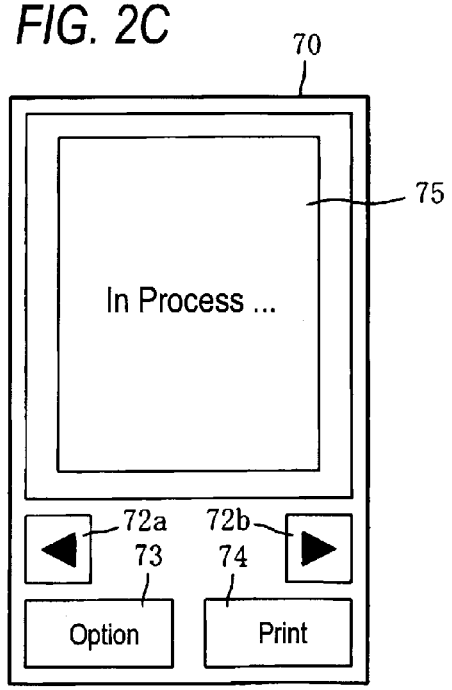

Next, representative screens that the device control application 14b displays on the LCD 18 will be described with reference to FIGS. 2A to 2D. FIGS. 2A to 2C are views illustrating the preview screen 70. On the preview screen 70, a preview image 71 or a dummy image 75 are displayed. The preview image 71 is an image for previewing print contents of the device 30. Meanwhile, the dummy image 75 is an image that is displayed as an alternative to the preview image 71 that should be displayed. In a case where converted data corresponding to the preview image 71 that should be displayed has already been acquired, the device control application 14b displays the preview image 71 on the preview screen 70 based on the converted data, as shown in FIGS. 2A and 2B. Meanwhile, in a case where converted data to be used for displaying the preview image 71 that should be displayed has not yet been acquired, the device control application 14b displays the dummy image 75 on the preview screen 70, as shown in FIG. 2C. Image data corresponding to the dummy image 75 is stored in a predetermined area of the flash memory 14 when the device control application 14b is installed.

FIG. 2A shows an example of the preview image 71 in a case where the number N of sections is 1. Meanwhile, FIG. 2B shows an example of the preview image 71 in a case where the number N of sections is 4. In FIGS. 2A and 2B, each number shown in the preview image 71 represents what page of a PDF file the corresponding image corresponds to. In other words, the preview image 71 shown in FIG. 2A represents that the corresponding image is an image of the fifth page of the PDF file, and the preview image 71 shown in FIG. 2B represents that the corresponding image is an 4-in-1 image including images of the fifth to eighth pages of the PDF file.

Further, the preview image 71 shown in FIG. 2A is a preview image of the fifth page among all preview images 71 that can be displayed in the case where the number N of sections is 1. Meanwhile, the preview image 71 shown in FIG. 2B is a preview image of the second page among all preview images 71 that can be displayed in the case where the number N of sections is 4. In other words, in a case where the number of sections is 2 or more, a page number of a preview image 71 is equal to a value obtained by dividing the maximum value of page numbers of the PDF file (8 in the example shown in FIG. 2B) corresponding to images included in the preview image 71 by N (4 in the example shown in FIG. 2B).

The preview screen 70 further includes a previous page button 72a, a next page button 72b, a print option button 73, and a print button 74. The previous page button 72a is an area for inputting an instruction for changing a current preview image 71 displayed on the preview screen 70 to the previous preview image 71. Meanwhile, the next page button 72b is an area for inputting an instruction for changing the current preview image 71 displayed on the preview screen 70 to the next preview image 71. If the user touches the previous page button 72a or the next page button 72b, the device control application 14b changes the current preview image 71 displayed on the preview screen 70 to the previous or next preview image 71 according to the manipulated button 72a or 72b. Until converted data for displaying the previous or next preview image according to the previous page button 72a or the next page button 72b is completely acquired, the device control application 14b displays the dummy image 75, as an alternative.

Figure 2D:
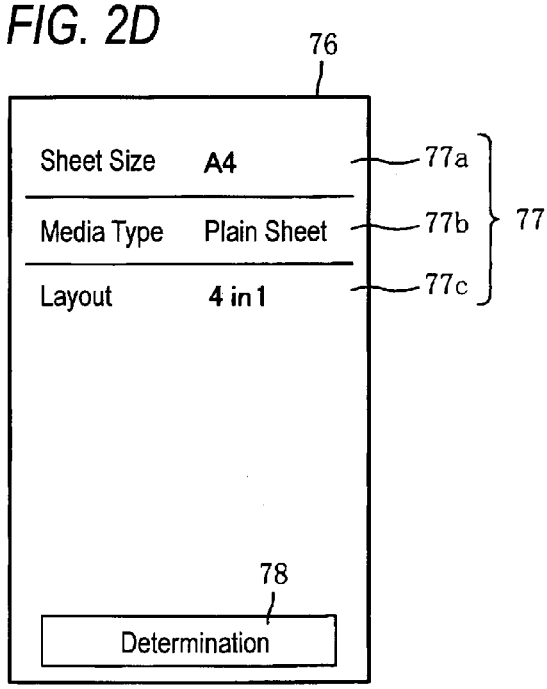

The print option button 73 is an area for inputting an instruction for displaying a print option screen 76 (see FIG. 2D). If the user touches the print option button 73, the device control application 14b switches the screen of the LCD 18 from a current display screen (for example, the preview screen 70) to the print option screen 76, such that the print option screen 76 is displayed. The print button 74 is an area that is for inputting an instruction for making the device 30 perform the printing function. If the user touches the print button 74, print data of an image corresponding to the preview image 71 is output to the device 30.

FIG. 2D is a view illustrating the print option screen 76. The print option screen 76 is a screen that displays set print options and allows the user to change the print options. The print option screen 76 includes a print option display area 77 and a determination button 78. The print option display area 77 is an area for displaying the set print options. The print option display area 77 includes a sheet size display area 77a, a media type display are 77b, and a layout display area 77c. The sheet size display area 77a is an area that displays a set value for a print sheet size (such as a A4 size, a 'Letter' size, or the like), the media type display are 77b is an area that displays a set value for a print sheet type (for example, plain paper, gloss paper, or the like), and the layout display area 77c is an area for displaying a set value for the number N of sections in an N-in-1 image (for example, a 4-in-1 image, a 2-in-1 image, an 1-in-1 image, or the like). If the user touches each of the display areas 77a to 77c, the device control application 14b displays a list of values settable for the touched display area on the LCD 18. Then, if the user touches a desired value in the displayed list, the set value is changed to the touched value.

The determination button 78 is an area for inputting an instruction for determining a set value displayed in the print option display area 77 (77a to 77c). If the user touches the determination button 78, the device control application 14b determines each set value displayed in the print option display area 77 (77a to 77c) by writing the corresponding set value in the print option memory 14c.

Figure 3:
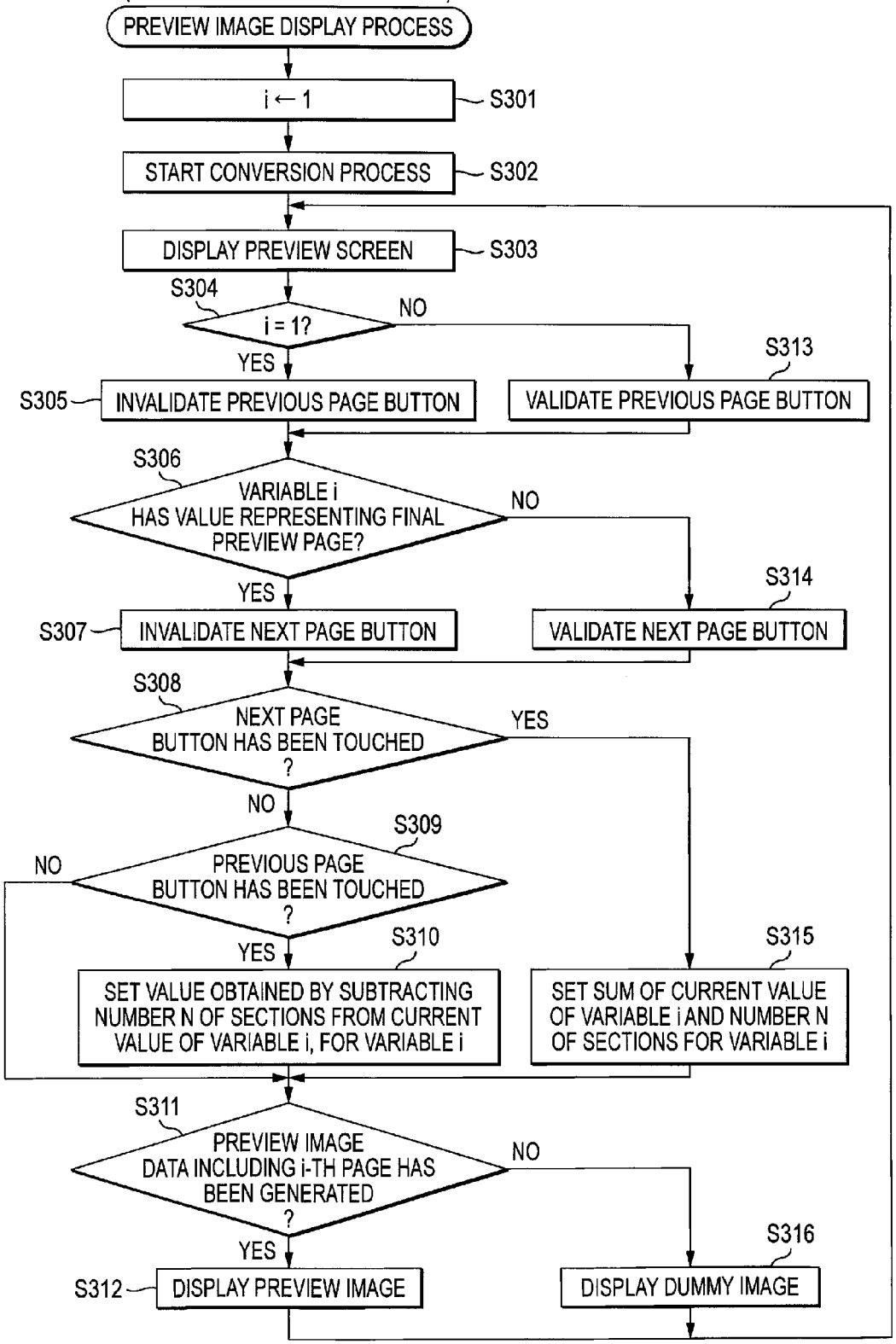
FIG. 3 is a flow chart illustrating a preview screen display process that is performed in the portable terminal.

FIG. 3 is a flow chart illustrating a preview image display process that is performed in the portable terminal 10. After the device control application 14b is activated, if the user designates a PDF file stored in the memory card 20 as a print target, the preview image display process starts to display preview images 71 corresponding to pages included in the PDF file, on the LCD 18. Each step shown in flow charts of FIGS. 3 to 6 to be described below will be described as a step which the device control application 14b makes the CPU 11 perform with/without using functions of the OS 14a or the like. However, some of steps of each flow chart may be changed to steps which the OS 14a or other applications make the CPU 11 perform. Alternatively, some of the steps of each flow chart may be changed to steps which are implemented by operation of hardware provided in the portable terminal 10 without involvement of the CPU 11.

First, in STEP S301, the CPU 11 sets 1 for a variable i. The variable i represents what page of the PDF file data an image to be displayed as the preview image 71 corresponds to. However, in a case where the number N of sections is 2 or more, the variable i represents what page of the PDF file a first image of an N-in-1 image to be displayed as the preview screen 70 corresponds to.

Next, in STEP S302, the CPU 11 starts a conversion process by a separate thread. The conversion process started by the process of STEP S302 is performed in parallel with the preview image display process by a task separate from that for the preview image display process. As will be described below in detail with reference to FIG. 4, the conversion process is a process that transmits (uploads) the PDF file, designated as the print target by the user, to the conversion server 300, acquires (downloads) JPEG files obtained by conversion of the conversion server 300 on the PDF file, and generates preview image data corresponding to the preview image 71 based on the acquired JPEG files.

Next, in STEP S303, the CPU 11 displays the preview screen 70 on the LCD 18. In this time, if preview image data of the preview image 71 including a page (that is, a first page) representing by the value '1' of the variable i has been generated by the conversion process started by the process of STEP S302 (see FIG. 4), the preview image 71 including the first page is displayed on the preview screen 70, and if the preview image data has not been generated, the dummy image 75 is displayed on the preview screen 70.

Next, in a case where the variable i is 1 (Yes in STEP S304), in STEP S305, the CPU 11 invalidates the previous page button 72a of the preview screen 70. Meanwhile, in a case where the variable i has a value other than 1 (No in STEP S304), in STEP S313, the CPU 11 validates the previous page button 72a of the preview screen 70.

Next, in a case where the variable i has a value representing a final page of the preview images 71 (final preview page) (a case where the variable i has a value representing a first page of a final preview page when the number N of sections is 2 or more) (Yes in STEP S306), in STEP S307, the CPU 11 invalidates the next page button 72b of the preview screen 70. Meanwhile, in a case where the variable i has a value representing a page other than the final preview page (a case where the variable i has a value representing a page other than the first page of the final preview page when the number N of sections is 2 or more) (No in STEP S306), in STEP S314, the CPU 11 validates the next page button 72b of the preview screen 70.

Then, if the next page button 72b is touched by the user (Yes in STEP S308), in STEP S315, the CPU 11 sets the sum of a current value of the variable i and the number N of sections for the variable i, and proceeds to STEP S311 of the process. The number N of sections is the set value for a layout stored in the print option memory 14c. Meanwhile, if not the next page button 72b but the previous page button 72a is touched by the user (No in STEP S308 and Yes in STEP S309), in STEP S310, the CPU 11 sets a value, obtained by subtracting the number N of sections from the current value of the variable I, for the variable i, and proceeds to STEP S311 of the process. If not only the next page button 72b but also the previous page button 72a are not touched (No in STEP S308 and No in STEP S309), the CPU 11 proceeds to STEP S311 of the process.

If preview image data of an N-in-1 image including a page (i-th page) represented by the value of the variable i has been generated (Yes in STEP S311), the CPU 11 displays a preview image 71 including the i-the page on the preview screen 70 in STEP S312, and proceeds to STEP S304 of the process. The preview image data is generated in the conversion process (see FIG. 4) to be described below.

Meanwhile, in a case where the preview image data of the preview image 71 including the i-th page has not been generated (No in STEP S311), the CPU 11 displays the dummy image 75 on the preview screen 70 in STEP S316, and proceeds to STEP S304 of the process.

Figure 4:
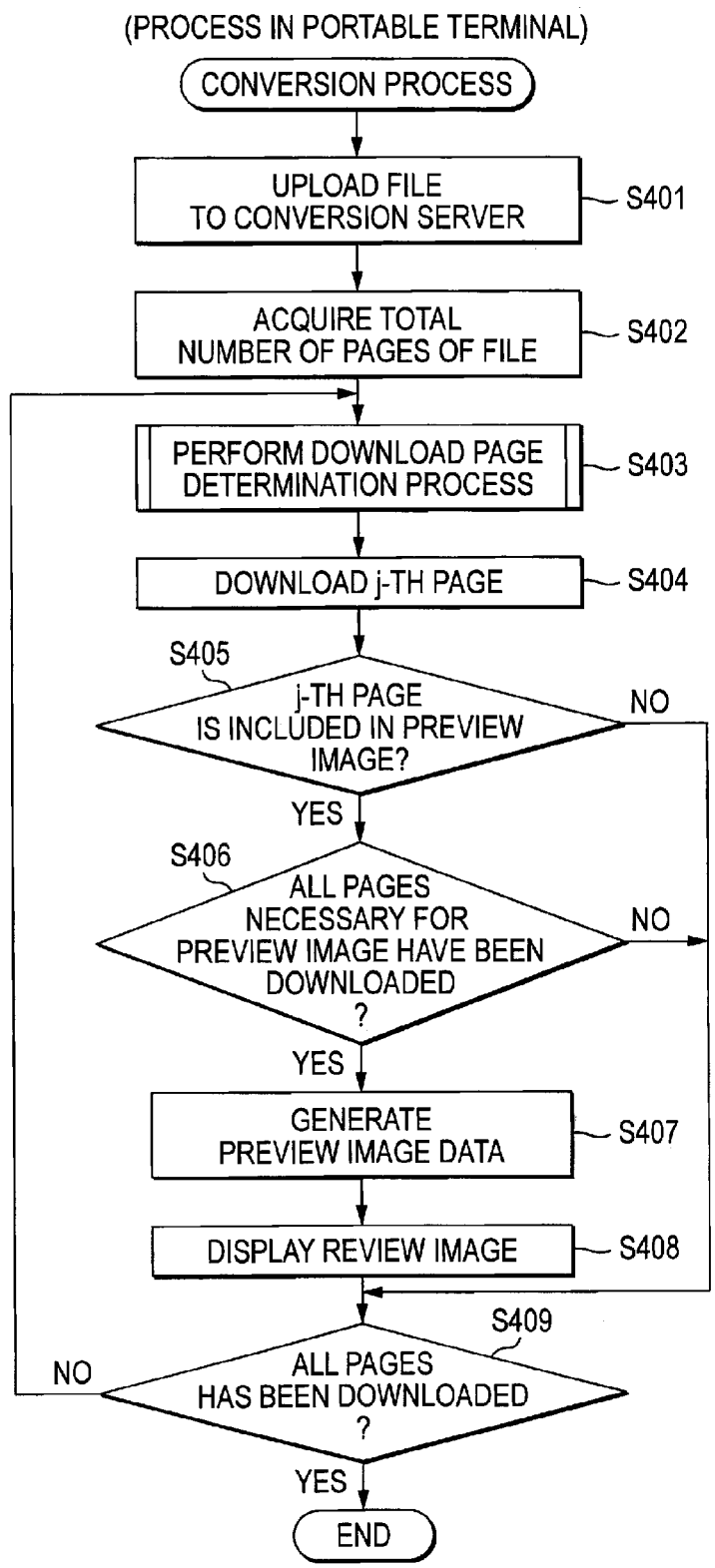
FIG. 4 is a flow chart illustrating a conversion process that is performed in the portable terminal.

Next, the conversion process started in STEP S302 of the above-mentioned preview image display process will be described with reference to FIG. 4. FIG. 4 is a flow chart illustrating the conversion process that is performed in the portable terminal 10. The conversion process is for acquiring the JPEG files generated by the conversion server 300, in unit of page, and generating preview image data based on the JPEG files.

First, in STEP S401, the CPU 11 uploads (transmits) the PDF file designated as a print target by the user, to the conversion server 300 through the telephone network communication unit 22. Then, the conversion server 300 converts the PDF file uploaded from the portable terminal 10 into the JPEG files. More specifically, the conversion server 300 generates the JPEG files from the individual pages included in the PDF file. Next, the conversion server 300 includes the total number of pages included in the uploaded PDF file in an upload completion notification, and transmits the upload completion notification to the portable terminal 10. If receiving the upload completion notification, in STEP S402, the CPU 11 acquires the total number of pages included in the upload completion notification, and stores the total number of pages in the RAM 13.

Next, in STEP S403, the CPU 11 performs a download page determination process of determining a page of a JPEG file to be downloaded (acquired) from the conversion server 300. The download page determination process (STEP S403) is a process of determining an JPEG file acquisition order based on the total number of pages acquired in STEP S402, and will be described below in detail with reference to FIG. 5.

Next, in STEP S404, the CPU 11 downloads the page (j-th page) determined in the download page determination process (STEP S403) from the conversion server 300 through the telephone network communication unit 22. Specifically, the CPU 11 transmits an instruction for outputting a JPEG file generated from the j-th page of the PDF file (hereinafter, referred to as a JPEG file of the j-th page), to the conversion server 300. According to the instruction received from the portable terminal 10, the conversion server 300 outputs (downloads) the JPEG file of the j-th page to the portable terminal 10, such that the portable terminal 10 acquires the JPEG file of the j-th page. The CPU 11 stores a downloaded JPEG file for each page in the memory card 20.

Next, if an image corresponding to the JPEG file of the j-th page downloaded from the conversion server 300 is included in a current preview image 71 to be displayed, and all pages necessary for the current preview image 71 to be displayed has been downloaded (Yes in STEP S405 and Yes in STEP S406), the CPU 11 proceeds to STEP S407 of the conversion process.

Next, in STEP S407, the CPU 11 generates preview image data from the JPEG file of the j-th page downloaded from the conversion server 300, and displays an image of the generated preview image data as the preview image 71 on the preview screen 70, and proceeds to STEP S409 of the process. In a case where the number N of sections is 2 or more, that is, a case where the layout stored in the print option memory 14c is N-in-1 and N is 2 or more, the CPU 11 generates preview image data of an N-in-1 image that is a layout of images based on the JPEG files of the j-th page to (i+N−1) page in STEP S407, and displays the N-in-1 image as the preview image 71 on the preview screen 70, based on the generated preview image data, in STEP S408, and proceeds to STEP S409 of the process.

If the image data of the j-th page downloaded from the conversion server 300 is not included in the current preview image to be displayed (No in STEP S405) or all pages necessary for the current preview image to be displayed has not been downloaded (No in STEP S406), the CPU 11 proceeds to STEP S409 of the process.

Next, in a case where all JPEG files that should be downloaded from the conversion server 300 have not been downloaded (No in STEP S409), the CPU 11 returns to STEP S403 of the process. Meanwhile, in a case where all JPEG files that should be downloaded from the conversion server 300 have been downloaded (Yes in STEP S409), the CPU 11 finishes the conversion process.

Figure 5:
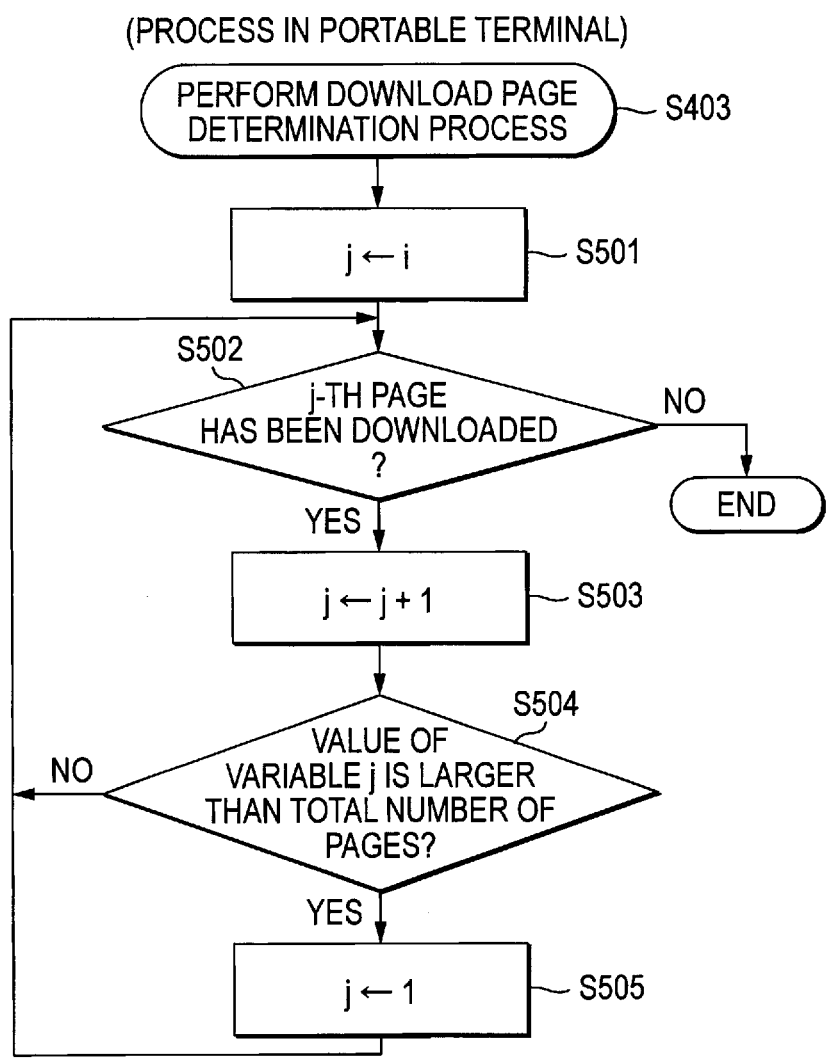
FIG. 5 is a flow chart illustrating a download page determination process that is performed during the conversion process.

Now, the above-mentioned download page determination process (STEP S403) will be described with reference to FIG. 5. FIG. 5 is a flow chart illustrating the download page determination process (STEP S403) that is performed during the conversion process of FIG. 4.

First, in STEP S501, the CPU 11 sets the current value of the variable i for a variable j. The variable j represents what page of the PDF file data for generating a JPEG file that should be downloaded corresponds to.

Next, in a case where a JPEG file of a page (j-th page) represented by the value of the variable j has not been downloaded from the conversion server 300 and has not been stored in the memory card 20 (No in STEP S502), the CPU 11 finishes the download page determination process. Then, in STEP S404 shown in FIG. 4, the JPEG file of the j-th page is downloaded from the conversion server 300. Therefore, in a case where a JPEG file generated from a page (i-th page) designated by the user has not yet been downloaded and has not been stored in the memory card 20, the JPEG file corresponding to that page can be acquired in preference to JPEG files of the other pages.

Meanwhile, in a case where the JPEG file of the page (j-th page) represented by the value of the variable j has been downloaded from the conversion server 300, and has been stored in the memory card 20 (Yes in STEP S502), in STEP S503, the CPU 11 sets the sum of a current value of the variable j and 1 for the variable j. Next, in a case where the value of variable j is not larger than the total number of pages of the PDF file acquired in STEP S402 (No in STEP S504), the CPU 11 proceeds to STEP S502 and repeats the process. Therefore, a JPEG file generated from a page, closer to the designated page in the page order of the PDF file, of pages from the page designated by the user and the final page can be acquired earlier.

Meanwhile, in a case where the value of the variable j is larger than the total number of pages of the PDF file (Yes in STEP S504), the CPU 11 sets 1 for the variable j in STEP S505, and proceeds to STEP S502. In other words, after JPEG files of pages from the page designated by the user to the final page are acquired, JPEG files of the first page to the previous page of the designated page in the PDF file are sequentially acquired.

As described above, according to the download page determination process, among the JPEG files generated from the PDF file, JPEG files that have not been stored in the memory card 20 can be acquired according to an acquisition order determined based on the designated page.

The preview image display process (FIG. 3) in which a designation of a page by the user is received, and the conversion process (FIG. 4) of sequentially downloading the JPEG files in an acquisition order based on the page designated by the user are performed in parallel with each other. Therefore, during the conversion process (FIG. 4), the user may designate another page by the preview image display process (FIG. 3) so as to change the variable i.

In this case, in the conversion process (FIG. 4), at a timing when the download page determination process (STEP S403 and FIG. 5) is performed, the value of the variable i representing the another page designated by the user is set for the variable j (STEP S501 and FIG. 5). As a result, in STEP S404, a JPEG file of the newly designated page (i-th page) is acquired in preference to the other JPEG files. Therefore, it is possible to quickly display the preview image 71 corresponding to the newly designated page. Then, when the download page determination process (STEP S403) is performed, JPEG files are sequentially downloaded in an acquisition order determined based on the newly designated page.

As described above, according to the device control application 14b of the present embodiment, even in a case of displaying the preview images 71 based on the JPEG files generated in the conversion server 300, it is possible to quickly display a preview image 71 corresponding to a designated page, and to reduce the waiting time of the user.

Further, the JPEG files are acquired in an appropriate order according to the acquisition order determined based on the designated page. In other words, according to the present embodiment, in a case where the JPEG file of the designated page has been acquired, next, a JPEG file of the next page is acquired. Therefore, in a case where the user having browsed a current display page touches the next page button 72b to browse the next preview image 71, at that time, it is highly likely that the JPEG file of the next page has already been acquired. Therefore, it is possible to quickly display the corresponding preview image 71.

The acquisition order is determined using the total number of pages included in the PDF file. Therefore, as described with reference to FIG. 5, it is possible to preferentially acquire the JPEG files of the designated page to the final page and then subsequently acquire the JPEG files of the first page to the previous page of the designated page.

Further, a JPEG file generated from a page, closer to the designated page in the page order of the PDF file, of pages from the designation page and the final page can be acquired earlier. Therefore, for example, in a case where the user touches the next page button 72b whenever browsing one page, to sequentially browse from the first designated page to the final page, at each time point when the user touches the next page button 72b, it is highly likely that the JPEG file of the designated page has already been acquired. Therefore, it is possible to quickly display the corresponding preview image 71.

Further, after the preview image display process (FIG. 3) starts and one page is designated, if another page is designated, an acquisition order is redetermined based on the another page. Therefore, even in the case where the another page has been designated, the JPEG files are sequentially acquired in an appropriate order.

Figure 6:
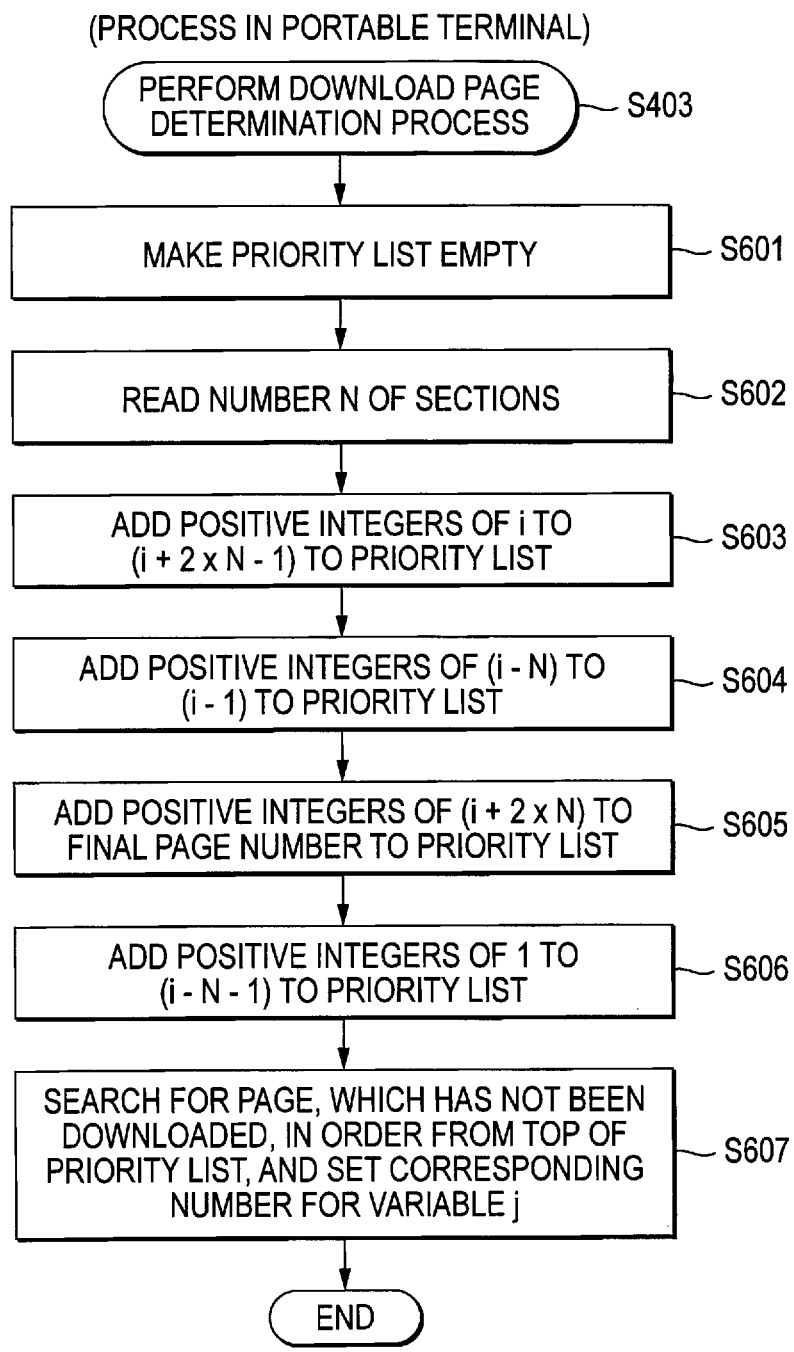
FIG. 6 is a flow chart illustrating a download page determination process according to a second process.
Figure 7:
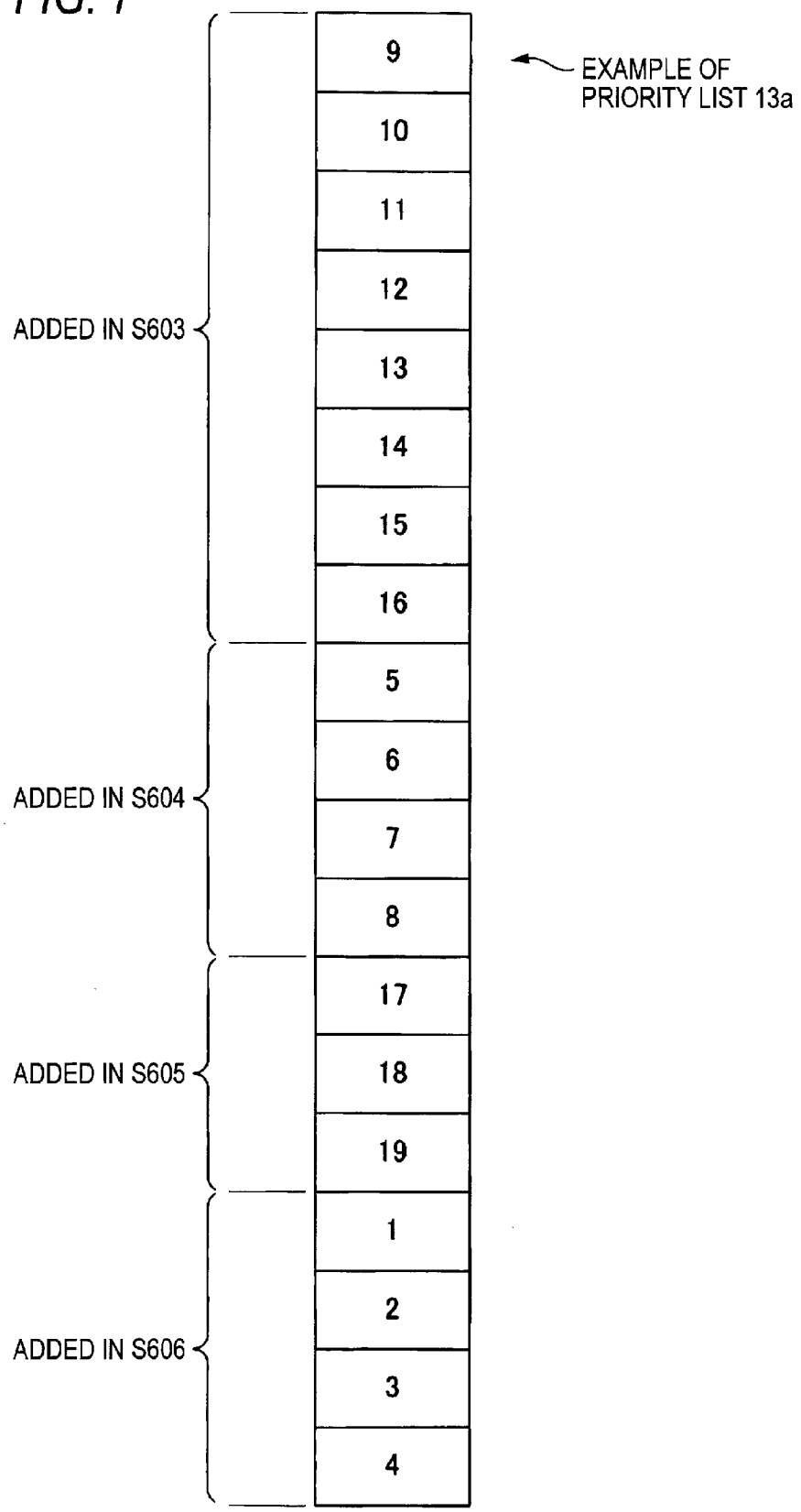
FIG. 7 is a view illustrating an example of a priority list which is generated by the download page determination process according to the second embodiment.

A second embodiment will be described with reference to FIGS. 6 and 7. A device control application 14b of the second embodiment is the same as the device control application 14b of the first embodiment except that, instead of the download page determination process (STEP S403) of the first embodiment, a download page determination process (STEP S403) shown in FIG. 6 is performed in the CPU 11, and JPEG files are acquired in an acquisition order according to a priority list 13a (FIG. 7). In the following description, identical components to the components described in the first embodiment are denoted by the same reference symbols, and the redundant description will not be repeated.

FIG. 6 is a flow chart illustrating the download page determination process (STEP S403) that is performed in the portable terminal 10 in accordance with the device control application 14b of the second embodiment. This process is configured such that JPEG files necessary for generating an N-in-1 image can be preferentially acquired.

First, the CPU 11 makes a priority list 13a empty in STEP S601, and then reads a current number N of sections from the print option memory 14c in STEP S602. Hereinafter, the number N of sections is referred to as N. Next, in STEP S603, the CPU 11 adds positive integers from the value of the variable i to (i+2×N−1), to the priority list 13a. In other words, pages of JPEG files necessary for displaying an N-in-1 image including the designated i-th page at the head and an N-in-1 image of the next page are stored in the priority list 13a.

FIG. 7 is a view schematically illustrating a structure of the priority list 13a generated in a case where i is 9 and N is 4. As shown in FIG. 7, in STEP S603, integers of 9 to 16 are added in ascending order from the top of the priority list 13a. In other words, a predetermined first number of page numbers consecutive from the designated i-th page to the final page are stored. In the example shown in FIG. 7, the predetermined first number is the number of pages corresponding to 4-in-1 images of two pages.

Returning to FIG. 6, next, in STEP S604, the CPU 11 adds positive integers from (i−N) to (i−1) to the priority list 13a. As shown in FIG. 7, in the priority list 13a, next to the values stored in STEP S603, integers of 5 to 8 are added in the ascending order in STEP S604. In other words, four pages necessary for generating preview image data of the 4-in-1 image of the previous page of the 4-in-1 image including the designated i-th page at the head are stored in the priority list 13a.

Returning to FIG. 6, next, in STEP S605, the CPU 11 adds positive integers from (i+2×N) to the final page number (that is, the total number of pages) to the priority list 13a. As shown in FIG. 7, in the priority list 13a, next to the values stored in STEP S604, integers of 17 to 19 are added in the ascending order in STEP S605. In other words, pages necessary for generating preview image data of 4-in-1 images of pages after the next page of the page of the 4-in-1 including the designated i-th page at the head are stored in the priority list 13a.

Returning to FIG. 6, a description will be made. Next, in STEP S606, the CPU 11 adds positive integers from 1 to (i−N−1) to the priority list 13a. As shown in FIG. 7, in the priority list 13a, next to the values stored in STEP S605, integers of 1 to 4 are added in the ascending order in STEP S606. In other words, the first page to the last page of the designated page are stored at the end of the priority list 13a.

Returning to FIG. 6, next, in STEP S607, the CPU 11 searches for a page which has not been downloaded (that is a page whose JPEG file has not been stored in the memory card 20), from the top of the priority list 13a, and if the page is found, the CPU 11 sets the number of the page for the variable j. Then, the CPU 11 finishes the download page determination process (STEP S403).

Then, the CPU 11 downloads (acquires) the JPEG file of the j-th page in STEP S404 of the conversion process (FIG. 4), and repeats the process. Whenever the download page determination process (STEP S403) is performed, a priority list 13a is regenerated. Therefore, after the priority list 13a is generated, if a designation of another page is received, a priority list 13a is regenerated based on the another page. In other words, a JPEG file acquisition order is redetermined based on the another page, and the JPEG files can be acquired according to the redetermined acquisition order.

According to the second embodiment, since JPEG files necessary for generating preview image data of an N-in-1 image are preferentially acquired, it is possible to quickly display an N-in-1 image including a designated page.

For example, in a case where a designation of an M-th page (M is an integer of 1 or more) is received, among JPEG files generated from a first predetermined number of pages consecutive from the (M+1)-th page toward the final page, a JPEG file which has not yet been stored in the memory card 20 is preferentially acquired. Therefore, in a case where the user having browsed the N-in-1 image including the designated M-th page touches the next page button 72b to browse the next N-in-1 image, it is possible to more quickly display the next N-in-1 image.

After the JPEG files generated from the first predetermined number (2×N) of pages from the (M+1)-th page are acquired, among JPEG files generated from a second predetermined number of pages consecutive from the (M−1)-th page toward the first page, a JPEG file which has not been stored in the memory card 20 is acquired.

Therefore, in a case where the user having browsed the N-in-1 image including the designated M-th page touches the previous page button 72a to browse the previous N-in-1 image, it is possible to more quickly display the previous N-in-1 image.

In the above-mentioned embodiments, the portable terminal 10 is an example of an information processing apparatus. The conversion server 300 is an example of an external apparatus. The PDF file is an example of target data, and the JPEG files are an example of converted data.

The CPU 11 is an example of a computer, an image-data generating unit, an order determining unit, or an acquiring unit. The touch panel 17 is an example of a manipulation receiving unit. The LCD 18 is an example of a display unit. The memory card 20 is an example of a storing unit or a converted-data storing unit. The telephone network communication unit 22 is an example of a transmitting unit or a receiving unit. However, each of the image-data generating unit, the order determining unit, the acquiring unit, the display unit, the transmitting unit, and the receiving unit may be a single piece of hardware, or hardware which operates by executing the programs according to the aspect of the present disclosure or programs such as an operating system other than the programs according to the aspect of the present disclosure. Each of those units may be software which is executed by a combination of processes according to a plurality of programs. Each of the storing unit and the converted-data storing unit may be provided in a memory built in the portable terminal 10, such as the flash memory 14, or may be provided in an installable and removable memory such as the memory card 20. Alternatively, the storing unit and the converted-data storing unit may be dispersively provided in a built-in memory and an installable and removable memory, or may be provided in either a built-in memory or an installable and removable memory.

Although the aspect of the present disclosure has been described based on the embodiment, it is easily inferable that the present invention is not limited to the above-mentioned embodiment, but may be variously modified for improvement without departing from the scope of the invention.

For example, in a case where a lot of pages are included in a PDF file and the user wants to see the outline thereof, the user may considerably jump a designated page from the first page to the 50-th page. In this case, if a JPEG file corresponding to the 50-th page has already been stored in the memory card 20, it is possible to display the preview image 71 corresponding to the 50-th page on the preview screen 70. According to the above-mentioned embodiments, even in that case, an acquisition order is redetermined based on the newly designated page. However, in the case where the user remarkably jumps the designated page, it is highly likely that the user considerably jumps the designated page in the next manipulation. In this case, there is a concern that the process of redetermining the acquisition order might be wasted.

Therefore, the above-mentioned embodiments may be modified, such that, in a case where a designation of another page is received and a JPEG file generated from the another page has not been stored in the memory card 20, an acquisition order is redetermined based on the another page. In this case, it is possible to suppress frequent changes in the acquisition order, and to reduce a load of the process.

A determined acquisition order is transmitted to the conversion server 300, and the conversion server 300 may sequentially generate JPEG files according to the acquisition order received from the portable terminal 10. In this case, only in a case where the acquisition order is more likely to be changed as compared to the case where the acquisition order is redetermined and transmitted to the conversion server 300 whenever another page is designated in the preview screen 70, for example, a case where another page is designated and a JPEG file generated from the another page has not been stored in the memory card 20, the acquisition order may be redetermined and transmitted to the conversion server 300.

In a case where the acquisition order is changed and is notified to the conversion server 300, in the conversion server 300, a process of search the PDF file for data that should be first processed in the changed acquisition order is required. Therefore, if the above-mentioned modification is applied to suppress changes in the acquisition order, it is possible to speed up the process of the conversion server 300.

It is likely that the user consecutively touches the next page button 72b merely for thumbing through a number of pages, not for designating a desire page. For this reason, the acquisition order may not be redetermined while the next page button 72b is consecutively touched.

Also, in a case where the previous page button 72a has been touched, since it is likely that the user wants the preview images 71 corresponding to pages preceding the designated page, the acquisition order may be redetermined such that a JPEG file of each page is acquired in the descending order of pages.

In the above-mentioned embodiments, JPEG files of the first page to the previous page of the designated page are acquired in the ascending order of the pages. As an alternative to that, the above-mentioned embodiments may be modified such that the JPEG files of the first page to the previous page of the designated page are acquired in the reverse order of the pages. In other words, the above-mentioned embodiments may be modified such that a JPEG file of a page closer to the designated page is earlier acquired. In this case, when the user having browsed the preview image 71 corresponding to the first designated page tries to go back one page by one page for browsing the preview images 71, it is possible to quickly display the corresponding preview images 71.

In a case where a designation of a page is received during acquiring of a JPEG file, the acquiring of the JPEG file may be stopped.

Figure 8:
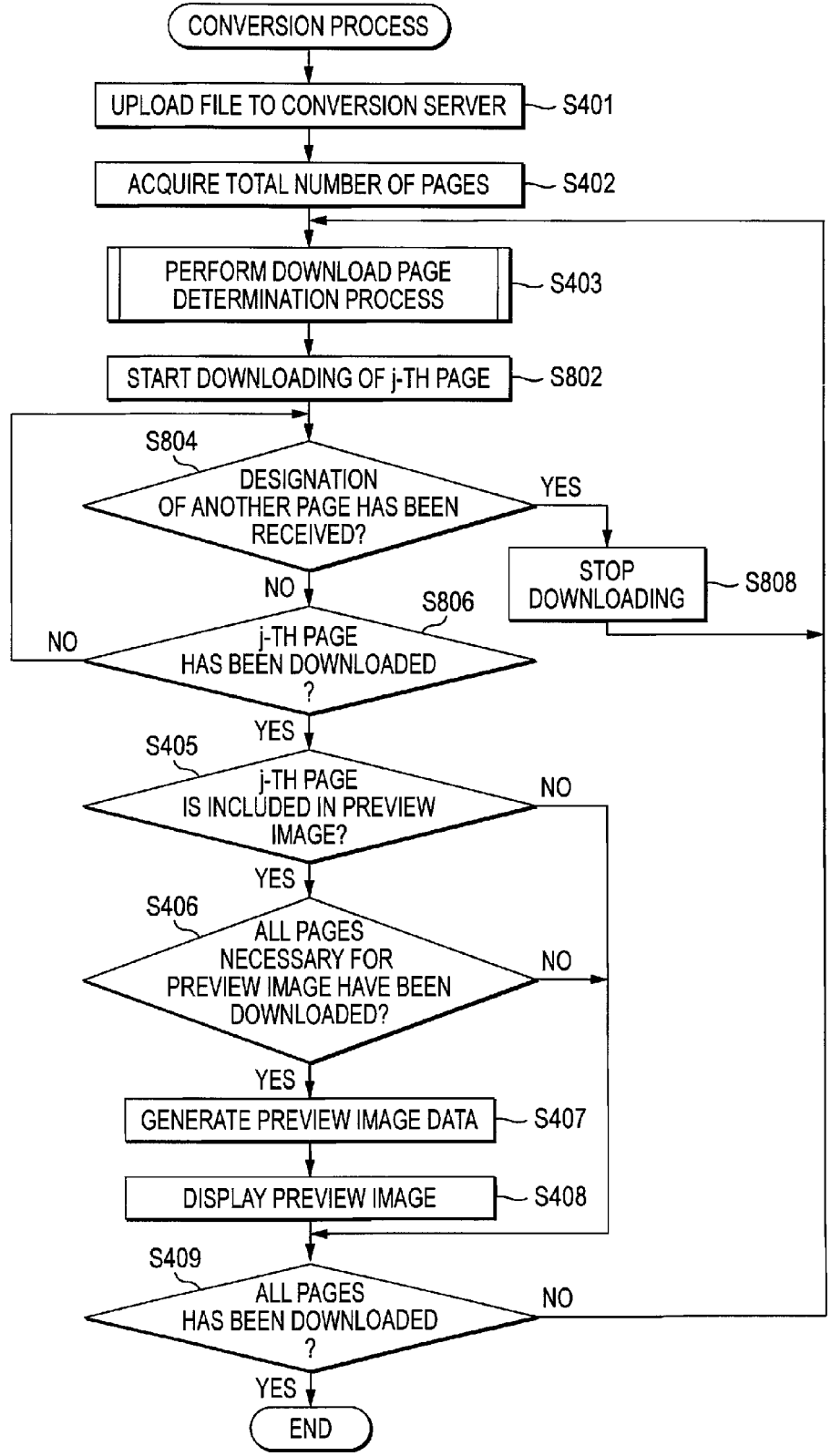
FIG. 8 is a flow chart illustrating a conversion process according to a modification.

FIG. 8 is a flow chart illustrating a conversion process according to a modification. Among steps shown in FIG. 8, identical steps as those included in the conversion process (FIG. 4) according to the embodiment are denoted by the same reference symbols, and the redundant description will not be repeated.

According to the conversion process according to the modification, as shown in FIG. 8, after downloading (acquiring) of the JPEG file of the j-th page starts in STEP 5802, if a designation of another page (that is, a page other than the j-th page) is received (Yes in STEP S804) until the downloading of the JPEG file of the j-th page is completed (No in STEP S806), the CPU 11 makes the telephone network communication unit 22 stop the acquiring of the JPEG file of the j-th page in STEP 5808, sets the number of the newly designated another page for the variable j in STEP 5403, and makes the telephone network communication unit 22 restart the acquiring of the JPEG file of the j-th page. Therefore, it is possible to more quickly display an image corresponding to a designated page, and to reduce the waiting time of the user.

In the above-mentioned embodiments, PDF is an example of a first format. However, file formats of files capable of including a plurality of pages, such as XLS, DOD, and TIFF, that is, file formats of so-called multi-files can correspond to examples of the first format. Further, a second format is not limited to JPEG. Various formats such as PNG, GIF, and BMP can correspond to examples of the second format.

In the above-mentioned embodiments, the portable terminal 10 having the communication function is an example of an information processing apparatus. However, various apparatuses having no communication function, such as a personal computer and a digital camera, can also be examples of the information processing apparatus. The present invention can also be applied to an apparatus that includes hardware keys capable of being manipulated for input without any touch panel.

In the above-mentioned embodiments, the OS 14a has been described as an Android OS. However, the present invention can also be applied to information processing apparatuses having other OSs.

In the above-mentioned embodiments, the portable terminal 10 is connected to the Internet 200 through the portable-phone network 100 by the telephone network communication unit 22. However, the present invention can also be applied to a case where the portable terminal is connected to the Internet 200 through the access point 50 by the wireless LAN transceiver 15 in order for saving communication cost.

Embodiments and the modification which are appropriate combination of the features of the embodiments and the features of the modification may be used.

According to the information processing apparatus, in a case where the manipulation receiving unit receives a designation of a page, if converted data generated from the designated page of the target data has not been stored in the converted-data storing unit, the converted data generated from the designated page of the target data is acquired in preference to the other converted data which has not been stored in the converted-data storing unit. Therefore, even when images are displayed based on the converted data generated in the external apparatus, it is possible to quickly display an image corresponding to a designated page and to reduce a waiting time of a user.

According to the information processing apparatus, converted data may be acquired in an acquisition order determined based on a designated page. Therefore, it is possible to acquire converted data in an appropriate order according to a designated page.

Further, according to the information processing apparatus, converted data corresponding to a page, closer to a designated page in a page order of the target data, of pages from the designated page to a final page, may be acquired earlier. Therefore, it is possible to quickly display images.

Furthermore, according to the information processing apparatus, in a case where a designation of an M-th page is received, converted data generated from a first predetermined number of pages consecutive from an (M+1)-th page toward the final page may be preferentially acquired. Therefore, it is possible to more quickly display images corresponding to the designated M-th page and the first predetermined number of pages consecutive from an (M+1)-th page toward the final page.

Next, among converted data generated from a second predetermined number of pages consecutive from an (M−1)-th page toward a first page, converted data which has not been stored in the converted-data storing unit may be acquired. Therefore, after browsing an image corresponding to a designated page, even if the user designates the previous page of the designated page, it is possible to quickly display a corresponding image, and to reduce the waiting time of the user.

Moreover, according to the information processing apparatus, converted data necessary for generating image data of an N-in-1 image may be preferentially acquired. Therefore, it is possible to quickly display an N-in-1 image corresponding to a designated page.

Moreover, according to the information processing apparatus, converted data may be acquired in an acquisition order determined based on a designated page. Therefore, it is possible to acquire converted data in an appropriate acquisition order according to a designated page.

Furthermore, according to the information processing apparatus, in a case where a designation of another page is received, an acquisition order is redetermined based on the another page. Therefore, after an acquisition order is determined on the basis on a designated page, even if another page is designated, it is possible to acquire converted data in an appropriate order.

Moreover, according to the information processing apparatus, in a case where a designation of another page is received, if converted data generated from the another page has not been stored in the converted-data storing unit, an acquisition order may be redetermined based on the another page. Therefore, it is possible to suppress frequent changes in acquisition order, and to reduce a load of the process.

Further, according to the information processing apparatus, it is possible to determine an appropriate acquisition order based on a total number of pages included in the target data.

Moreover, according to the information processing apparatus, after acquiring of converted data start, if a designation of a page is received before the acquiring of the converted data is completed, the acquiring of the converted data may be stopped, and converted data corresponding to the designated page may be preferentially acquired. Therefore, it is possible to more quickly an image corresponding to the designated page and to reduce the waiting time of the user.

What is claimed is:

1. An information processing apparatus comprising:
    a storing unit configured to store target data of a first format, the first format being capable of constituting a multi-page file and the target data including a plurality of pages;
    a transmitting unit configured to transmit the target data stored in the storing unit;
    a converted-data acquiring unit configured to acquire, in unit of page, converted data of a second format, which is generated by an external apparatus by converting the target data transmitted by the transmitting unit;
    a display unit configured to display an image corresponding to each page included in the target data based on the converted data acquired by the converted-data acquiring unit;
    a converted-data storing unit configured to store the converted data acquired by the converted-data acquiring unit; and
    a manipulation receiving unit configured to receive an input,
    wherein, if the manipulation receiving unit receives a designation of a page while the converted-data acquiring unit is acquiring the converted data, and the converted data which is generated based on the designated page of the target data is not stored in the converted-data storing unit, the converted-data acquiring unit acquires the converted data generated based on the designated page of the target data in preference to the converted data which is not stored in the converted-data storing unit and does not correspond to the designated page of the target data, and
    wherein after the converted-data acquiring unit acquires the converted data which is generated based on the designated page of the target data, the converted-data storing unit acquires the converted data which is not stored in the converted-data storing unit and does not correspond to the designated page of the target data.

2. The information processing apparatus according to claim 1, wherein the converted-data acquiring unit acquires the converted data which is not stored in the converted-data storing unit and does not correspond to the designated page of the target data according to an acquisition order determined based on the designated page.

3. The information processing apparatus according to claim 1, wherein, of pages from the designated page to a final page, the converted-data acquiring unit acquires the converted data from the external apparatus in an order from a page closer to the designated page.

4. The information processing apparatus according to claim 1, wherein in the case where the manipulation receiving unit receives a designation of an M-th page (M is an integer of 1 or more),
    of the converted data generated from a first predetermined number of pages consecutive from an (M+1)-th page of the target data toward a final page, the converted-data acquiring unit acquires the converted data in an acquisition order in which converted data which is not stored in the converted-data storing unit, and then
    of the converted data generated from a second predetermined number of pages consecutive from an (M−1)-th page of the target data toward a first page, the converted-data acquiring unit acquires the converted data, which is not stored in the converted-data storing unit.

5. The information processing apparatus according to claim 1 further comprising an N-in-1 image data generating unit configured to generate image data of an N-in-1 image in which images based on the converted data acquired by the converted-data acquiring unit are laid out, based on N-in-1 information, the N-in-1 information being stored in the storing unit and representing the number N of pages of images for one page (N is an integer of 1 or more), wherein the display unit displays the N-in-1 image based on the image data generated by the N-in-1 image data generating unit, and wherein in a case where a value of N of the N-in-1 information is an integer of 2 or more, if the manipulation receiving unit receives a designation of a page, the converted-data acquiring unit acquires converted data, which is not stored in the converted-data storing unit, of converted data that is generated from N-number of consecutive pages including the designated page, in preference to the other converted data, which is not stored in the converted-data storing unit, of the converted data generated from the target data.

6. The information processing apparatus according to claim 1 further comprising an order determining unit configured to, if the manipulation receiving unit receives a designation of a page, determine an acquisition order for the converted data based on the designated page, wherein the converted-data acquiring unit acquires the converted data in the acquisition order determined by the order determining unit.

7. The information processing apparatus according to claim 6 further comprising a redetermining unit configured to, if the manipulation receiving unit receives a designation of another page after the acquisition order is determined by the order determining unit, redetermine the acquisition order based on said another page, wherein the converted-data acquiring units acquires the converted data according to the acquisition order redetermined by the redetermining unit.

8. The information processing apparatus according to claim 7, wherein in the case where the manipulation receiving unit receives the designation of the another page, if converted data generated from the another page has not been stored in the converted-data storing unit, the reteremining unit redetermines the acquisition order based on the another page.

9. The information processing apparatus according to claim 5 further a total-page-number acquiring unit configured to acquire a total number of pages included in the target data transmitted by the transmitting unit, wherein the order determining unit determines the acquisition order based on the total page number acquired by the total-page-number acquiring unit.

10. The information processing apparatus according to claim 1 further comprising:

a stop control unit configured to control the converted-data acquiring unit to stop acquiring of converted data by the converted-data acquiring unit if the manipulation receiving unit receives a designation of a page after the converted-data acquiring unit starts the acquiring of the converted data before the acquiring of the converted data is completed; and an acquisition restart control unit configured to control the converted-data acquiring unit to restart acquiring of converted data generated from the designated page, after the acquiring of the converted data is stopped by the stop control unit.

11. A non-transitory computer readable recording medium storing an information processing program to be executed by a computer of an information processing apparatus including a transmitting unit, a receiving unit, a storing unit, a display unit and a manipulation receiving unit, the information processing program comprising:

a transmission control instruction that causes the transmitting unit to transmit target data of a first format stored in the storing unit, the first format being capable of constituting a multi-page file and the target data including a plurality of pages;

a converted-data acquiring instruction that causes the receiving unit to acquire, in unit of page, converted data of a second format, which is generated by an external apparatus by converting the target data transmitted by the transmitting unit;

a display control instruction that causes the display unit to display an image corresponding to each page included in the target data based on the converted data acquired by the converted-data acquiring instruction; and a converted-data storing instruction that causes the storing unit to store the converted data acquired by the converted-data acquiring instruction, wherein, if the manipulation receiving unit receives a designation of a page while the converted-data acquiring unit is acquiring the converted data, and the converted data which is generated based on the designated page of the target data is not stored in the storing unit, the converted-data acquiring instruction causes the receiving unit to acquire the converted data generated based on the designated page of the target data in preference to the converted data which is not stored in the storing unit and does not correspond to the designated page of the target data, and wherein after the converted-data acquiring unit acquires the converted data which is generated based on the designated page of the target data, the converted-data storing unit acquires the converted data which is not stored in the converted-data storing unit and does not correspond to the designated page of the target data.

12. The non-transitory computer readable recording medium according to claim 11, wherein the converted-data acquiring instruction causes the receiving unit to acquire the converted data which is not stored in the storing unit and does not correspond to the designated page of the target data according to an acquisition order determined based on the designated page.

13. The non-transitory computer readable recording medium according to claim 11, wherein, of pages from the designated page to a final page, the converted-data acquiring instruction causes the receiving unit to acquire the converted data from the external apparatus in an order from a page closer to the designated page.

14. The non-transitory computer readable recording medium according to claim 11, wherein in the case where the manipulation receiving unit receives a designation of an M-th page (M is an integer of 1 or more), of the converted data generated from a first predetermined number of pages consecutive from an (M+1)-th page of the target data toward a final page, the converted-data acquiring instruction causes the receiving unit to acquire the converted data in an acquisition order in which converted data which is not stored in the storing unit, and then of the converted data generated from a second predetermined number of pages consecutive from an (M−1)-th page of the target data toward a first page, the converted-data acquiring instruction causes the receiving unit to acquire the converted data, which is not stored in the storing unit.

15. The non-transitory computer readable recording medium according to claim 11, wherein
the program further includes an N-in-1 image data generating instruction that causes the computer to generate image data of an N-in-1 image in which images based on the converted data acquired by the receiving unit are laid out, based on N-in-1 information, the N-in-1 information being stored in the storing unit and representing the number N of pages of images for one page (N is an integer of 1 or more),
the display control instruction causes the display unit to display the N-in-1 image based on the image data generated by the N-in-1 image data generating instruction, and
in a case where a value of N of the N-in-1 information is an integer of 2 or more, if the manipulation receiving unit receives a designation of a page, the converted-data acquiring instruction causes the receiving unit to acquire converted data, which is not stored in the storing unit, of converted data that is generated from N-number of consecutive pages including the designated page, in preference to the other converted data, which is not stored in the storing unit, of the converted data generated from the target data.

16. The non-transitory computer readable recording medium according to claim 11, wherein
the program further includes an order determining instruction that causes, if the manipulation receiving unit receives a designation of a page, the computer to determine an acquisition order for the converted data based on the designated page, and
the converted-data acquiring instruction makes the receiving unit to acquire the converted data in the acquisition order determined by the order determining instruction.

17. The non-transitory computer readable recording medium according to claim 16, wherein
the program further includes a redetermining instruction that causes, if the manipulation receiving unit receives a designation of another page after the acquisition order is determined by the order determining instruction, the computer to redetermine the acquisition order based on said another page, and
the converted-data acquiring instruction causes the receiving unit to acquire the converted data according to the acquisition order redetermined by the redetermining instruction.

18. The non-transitory computer readable recording medium according to claim 17, wherein in the case where the manipulation receiving unit receives the designation of the another page, if converted data generated from the another page has not been stored in the storing unit, the redetermining instruction causes the computer to redetermine the acquisition order based on the another page.

19. The non-transitory computer readable recording medium according to claim 15, wherein
the program further includes a total-page-number acquiring instruction that causes an acquiring unit to acquire a total number of pages included in the target data transmitted by the transmitting unit, and
the order determining instruction causes the computer to determine the acquisition order based on the total page number acquired by the total-page-number acquiring instruction.

20. The non-transitory computer readable recording medium according to claim 11, wherein the program further includes:
a stop control instruction that causes the computer to stop acquiring of converted data by the receiving unit if the manipulation receiving unit receives a designation of a page after the receiving unit starts the acquiring of the converted data before the acquiring of the converted data is completed; and
an acquisition restart control instruction that causes the receiving unit to restart acquiring of converted data generated from the designated page, after the acquiring of the converted data is stopped by the stop control instruction.

21. An information processing method that is performed in an information processing apparatus, the method comprising:
transmitting target data of a first format, the first format being capable of constituting a multi-page file and the target data including a plurality of pages;
acquiring, in unit of page, converted data of a second format, which is generated by an external apparatus by converting the transmitted target data;
displaying an image corresponding to each page included in the target data based on the acquired converted data; and
storing the converted data acquired by the converted-data acquiring instruction in a storing unit,
wherein, if a designation of a page is received while the converted-data is being acquired, and the converted data which is generated based on the designated page of the target data is not stored in the storing unit, the converted data generated based on the designated page of the target data is acquired in preference to the converted data which is not stored in the storing unit and does not correspond to the designated page of the target data, and
wherein after the converted data which is generated based on the designated page of the target data is acquired, the converted data which is not stored in the converted-data storing unit and does not correspond to the designated page of the target data is acquired.

* * * * *